Sept. 14, 1937.  F. R. HOLCOMBE  2,093,196
FUEL SAVING MEANS FOR INTERNAL COMBUSTION ENGINES
Filed July 2, 1936  2 Sheets-Sheet 1
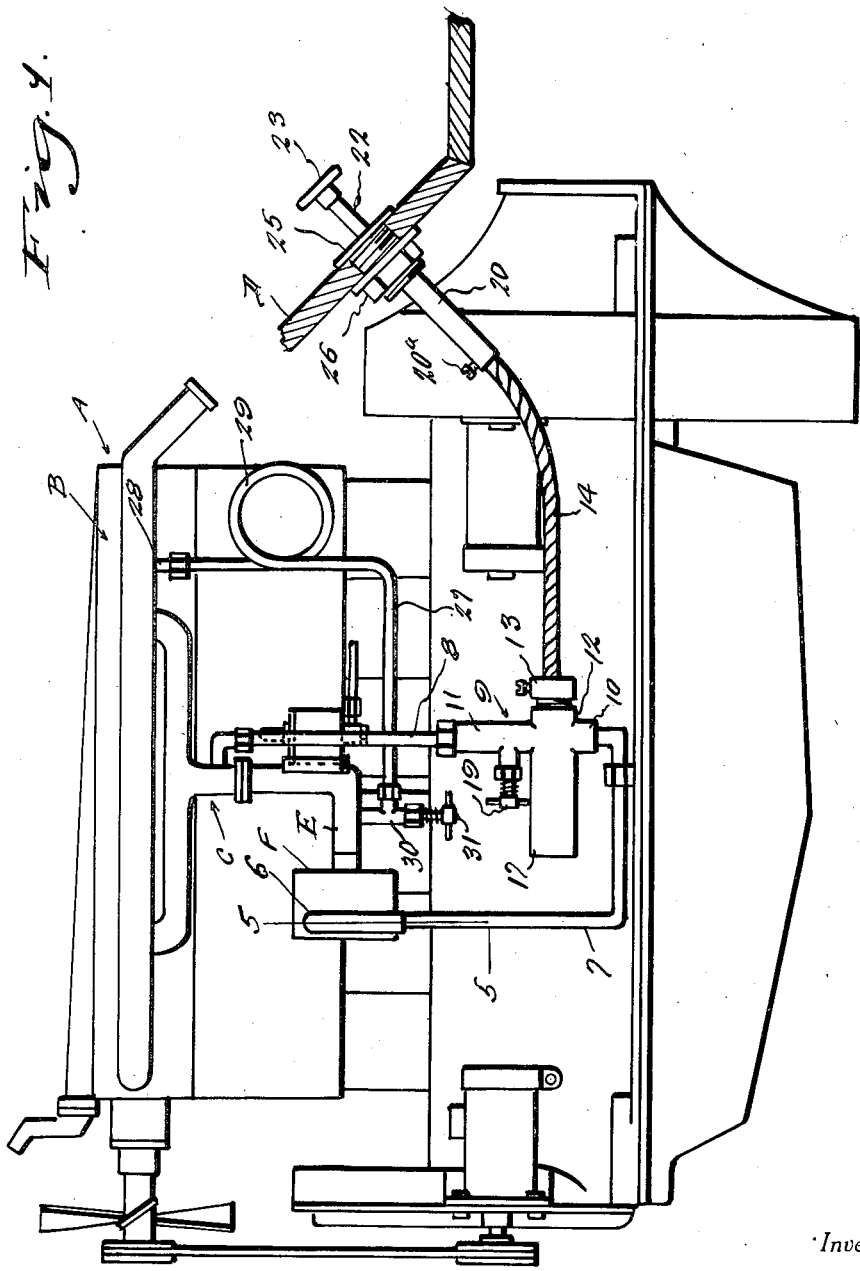
Inventor
Fred R. Holcombe
By Clarence A. O'Brien
Hyman Berman
Attorneys

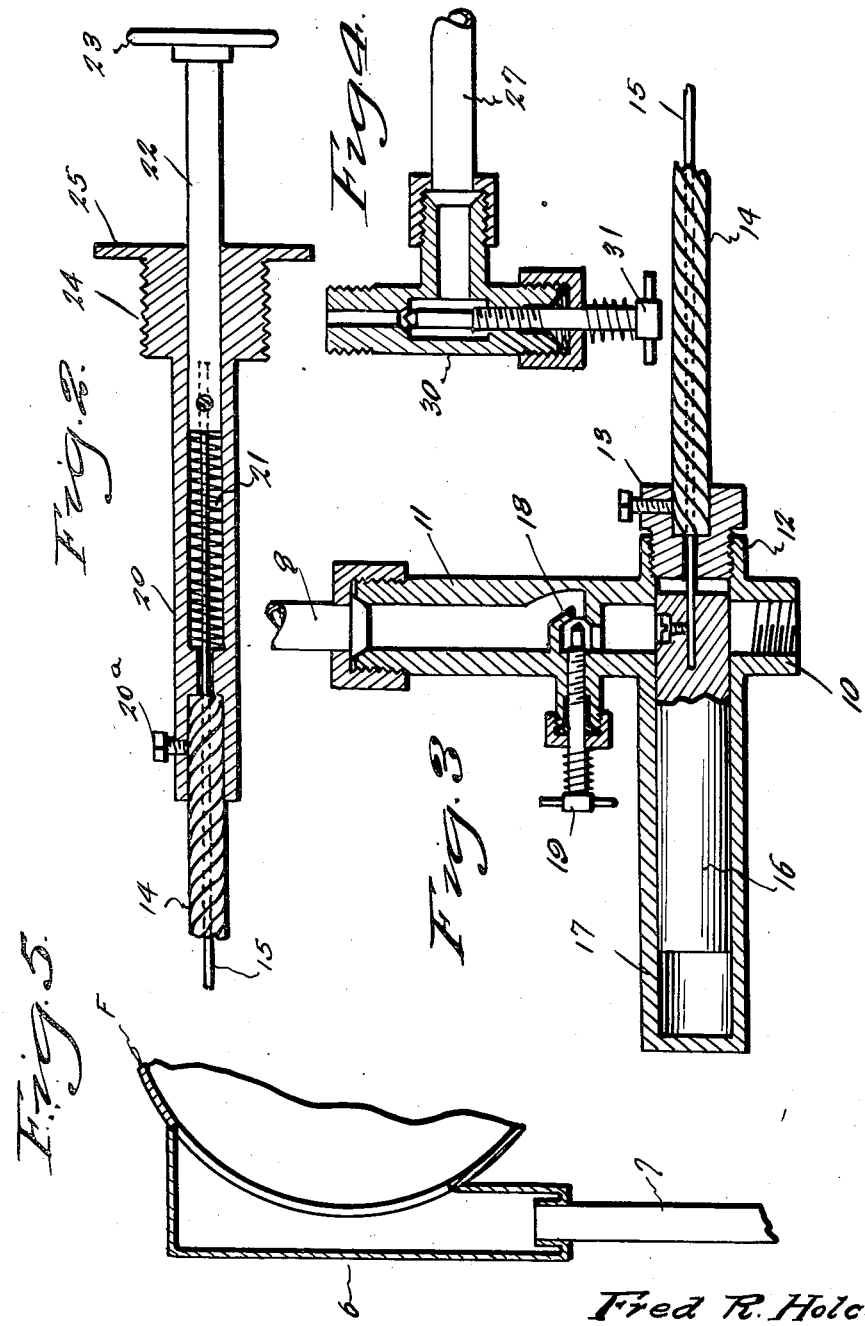

Patented Sept. 14, 1937

2,093,196

UNITED STATES PATENT OFFICE 2,093,196

FUEL SAVING MEANS FOR INTERNAL COMBUSTION ENGINES

Fred R. Holcombe, Trenton, N. J.

Application July 2, 1936, Serial No. 88,677

2 Claims. (Cl. 123—119)

This invention relates to internal combustion engines such as are used in present day automobiles and equivalent motor vehicles, and it has reference in particular to a correlation and coordination of accessories or devices supplementary to the regular carburetor and intake manifold calculated to facilitate the operation of the engine and in so doing to economize on fuel.

One phase of the invention has to do with so-called additional air supply means, this being in the nature of an attachment connectible with the intake manifold above the carburetor and receiving its air from the conventional air cleaner or strainer device on the intake branch of said manifold, foot-controlled valve means being utilized to regulate the supply of additional air at the discretion of the operator of the car.

A further feature of the invention has to do with supplementary piping means connected at one end to the exhaust manifold and at its opposite end to the air intake branch of the intake manifold whereby to introduce into said branch a predetermined supply of exhaust gases designed to expedite vaporization of the fuel charge admitted to the cylinders.

It is believed that the incorporation in the existing system of this additional air supply means in conjunction with the exhaust supply vaporizing means produces certain cumulative results materially enhancing combustion and thereby improving motor operation while saving fuel.

Other features and advantages will become more readily apparent from the following description and drawings.

In the drawings, wherein like numerals are employed to designate corresponding parts throughout the views:

Figure 1 is a side elevational view of a conventional internal combustion engine or automobile motor showing the intake and exhaust manifold and the accessories or attachments cooperable therewith in accordance with my invention.

Figure 2 is a view partly in section and partly in elevation showing the foot pedal construction.

Figure 3 is a view partly in section and partly in elevation showing the special valve unit for regulating the incoming additional supply of air.

Figure 4 is a fragmentary detail sectional view showing the needle valve for regulating the incoming auxiliary supply of exhaust gases to the intake manifold.

Figure 5 is an enlarged fragmentary detail section taken approximately on the plane of the line 5—5 of Figure 1.

Referring now to the drawings by distinguishing reference numerals, it will be observed that the motor is indicated by the letter A, the exhaust manifold is indicated at B, the intake manifold at C, the floor board at D. The air inlet branch of the intake manifold is indicated at E, and is provided with a conventional air strainer or cleaner F of the so-called muffler type. This is modified to include a side connection 6 to which the auxiliary or additional air supply pipe 7 is connected. The auxiliary air is fed into the intake manifold above the carburetor by way of the supply pipe 8. Between the pipes 7 and 8 is the foot-regulated valve means or unit 9. As shown in Figure 3, this unit includes a single casting of a three-way type. For example, the air inlet pipe line 7 is connected with the intake branch 10. The supply pipe 8 is connected to the somewhat elongated branch 11. The remaining branch 12 is in the form of a neck to accommodate a fitting 13 held in place by screw threads. The fitting serves to accommodate flexible shafting including a flexible casing 14 having a control wire 15 mounted for reciprocation therein. The control wire is fastened to a piston or valve 16 mounted for reciprocation in a right angularly disposed horizontal cylinder 17 projecting from the body portion of the valve casing in alignment with the neck 12 and at right angles to the branches 10 and 11. In the branch 11 is a suitable check device 18 with which a hand-regulated needle valve 19 is cooperable to definitely regulate the auxiliary air supplied from the line 7 to the line or pipe 8.

The valve-actuating wire 15 is controlled by a foot pedal arrangement. This includes a special adapter unit shown in Figures 1 and 2. As detailed in Figure 2, the unit includes a tubular body 20 to which one end of the flexible casing 14 is fastened as indicated at 20. Mounted in this body is a coiled automatic return spring 21 cooperable with the stem 22 of the pedal 23. The stem is mounted for reciprocation in the tube 20 which is in effect a cylinder. At one end of the cylinder is a threaded attaching head 24 having a retaining flange 25 engaging the floor board and held in place by a clamping nut 26, as shown in Figure 1. The spring serves to normally project the pedal above the floor board D and when the pedal is depressed against the tension of the spring it serves to open the valve 16 and introduce the auxiliary air. The air is drawn in by the suction produced in the intake manifold and when the valve is open it enters the cleaner and passes into the pipe 7 by way of the connection 6 and then on through the valve 9 and pipe connection 8 into the intake manifold above the carburetor.

Attention is now called to the numeral 27 in Figure 1 which designates an additional complementary pipe line, one end of which is attached as at 28 to the exhaust manifold. This pipe is provided with a pigtail coil 29 to overcome overheating of the limited exhaust gases passing through said pipe line 27 into the air inlet branch E. An appropriate connection 30 is utilized for attaching the line 27 to the branch E. The connection as shown in Figure 4, is provided with an appropriate fitting and made with a valve seat to accommodate the hand-regulated needle valve 31. By thus regulating the valve 31, exhaust gases are drawn into the intake manifold under the suction of the engine in a well known manner. It is submitted that by introducing exhaust gases into the air inlet branch E to mix with the main air supply to the carburetor in advance of the carburetor, and by introducing auxiliary air by way of the pipe line 8 into the intake manifold above the carburetor, under the discretionary control of the operator of the car, these two mediums combine, so to speak, in facilitating vaporization and thereby enhance combustion.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structural assemblage of the class described, in combination, an internal combustion engine motor including an exhaust manifold, an intake manifold, a carburetor connected with said intake manifold, said intake manifold having an air inlet branch, an air cleaner device connected with said air inlet branch, an additional air supply pipe connected at one end with said air cleaner device, a second complemental pipe connected with the intake manifold above said carburetor, a valve unit connecting the adjacent ends of said pipes together in communicating relationship, said valve unit being in the form of a single body including aligned branches connected with said complemental pipes and further including a horizontally disposed cylinder closed at one end and open at the opposite end, a cut-off valve in the form of a piston slidably mounted in said cylinder, foot control operating means for said piston-valve, and a hand-controlled regulating and cut-off valve mounted in said unit.

2. An additional air supply attachment adapted for connection at one end with an air cleaning device on the inlet branch of an intake manifold and connectible at its opposite end with the intake manifold above and within the vicinity of a conventional carburetor, said attachment comprising a pipe for connection with the air cleaner, and a second pipe for connection with the intake manifold, adjacent ends of said pipes being disposed in alignment, a unitary three-way valving unit comprising a main vertical branch having its ends connected with the adjacent ends of said pipes, and a horizontally disposed cylinder intersecting the intermediate portion of said vertical branch and closed at one end and open at the opposite end, a piston valve slidable in said cylinder and adapted to bridge the main branch to control the passage of air therethrough, remote control foot-actuating means for said piston, and a hand-controlled needle valve mounted for operation in said main vertical branch.

FRED R. HOLCOMBE.